March 24, 1942.
H. E. SOMES
2,277,564
ADAPTER
Filed May 20, 1940
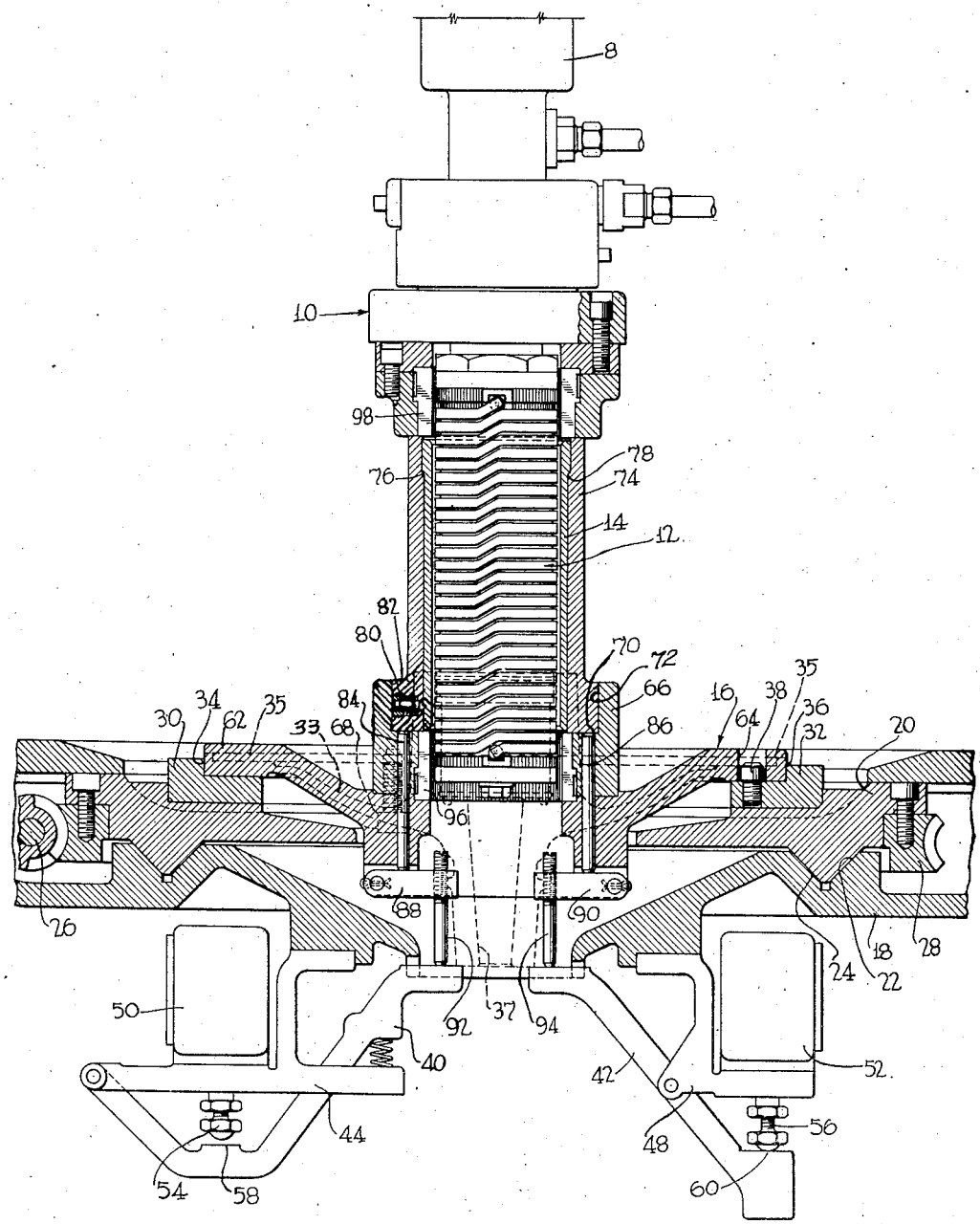
INVENTOR.
Howard E. Somes
BY John P. Tarbox
ATTORNEY.

Patented Mar. 24, 1942

2,277,564

UNITED STATES PATENT OFFICE 2,277,564

ADAPTER

Howard E. Somes, Detroit, Mich., assignor to Budd Induction Heating, Inc., Philadelphia, Pa., a corporation of Michigan Application May 20, 1940, Serial No. 336,127

6 Claims. (Cl. 219—13)

This invention relates to work holding adapters and particularly adapters in which proper loading indicators are required.

The present invention relates to an adapter for holding workpieces in an apparatus arranged to receive a workpiece similar to the adapter and in which the adapter is so arranged as to operate switches and indicators ordinarily operable by the workpiece for which the apparatus is constructed and arranged to receive the switches and indicators being operated through the adapter for the same purpose and in the same manner by the adapter and the workpiece for which the adapter is adapted. In a copending application Serial No. 164,320, filed September 17, 1937, there is disclosed a work holder having provision for receiving a wheel hub, the proper positioning of which hub within the work holder actuates certain switches. The invention as herein developed essentially is an adapter adapted to be received in a work holder of the type disclosed in the aforementioned application and which adapter in turn receives a workpiece, the adapter having provision for operating the switches formerly operable by the hub by the proper insertion of the workpiece in the adapter. The novel feature of the invention relates to the simplicity of the structure and the manner of its use and its cooperation with the existing controls of the main apparatus.

Accordingly, an object of the invention is to provide an adapter of relatively simple construction and ease of use in which there is incorporated means for communicating therethrough to the adapter receiving apparatus a proper loading indication by work received in the adapter.

This and other novel features of the invention will appear more fully hereinafter from the following detailed description when taken in conjunction with the accompanying drawing. It is expressly understood, however, that the drawing is for purposes of illustration only and are not designed as a definition of the invention, reference being had for this purpose to the appended claims.

In the drawing wherein like reference characters indicate like parts, the single figure illustrates in section the adapter of the invention arranged in position upon a suitable apparatus of the induction heating type disclosed in the aforementioned application.

In such machines the heat treating head 10 is generally mounted upon an arbor 8 so the same may be inserted into a workpiece by relative reciprocal motion between the work and its work support and the heat treat head. As illustrated the heat treat head is of the "one shot" type, that is, the entire area is heated simultaneously and the head thereafter removed, the same having a coil 12 of sufficient length to heat treat the entire internal surface of the cylinder sleeve 14 which forms the workpiece for which the adapter generally denoted by the reference character 16 is designed. In practice, it will, of course, be understood that the heat treat head may be of a relatively short length and the same progressed through a cylindrical workpiece so as to progressively heat the same, all of which is set forth in the application hereinabove referred to.

The apparatus for which the adapter is constructed comprises a frame 18 which may be reciprocated upon a fixed support not shown relative to the heat treat head or the heat treat head may be reciprocated upon a support so that the frame portion 18 may be rigid. Arranged upon the stationary frame is a rotatable turn table 20, the same having an annular ridge 22 received in an annular complemental groove 24 in the frame, the ridge and groove maintaining the turn table accurately upon a fixed axis. Rotation of the turn table may be effected by a motor or hand operated worm 26 operating upon a worm wheel 28, the latter being secured to the rotatable table. The table is adapted to receive upon the cheeks 30 and 32 arranged thereon a wheel hub forging or casting whose important features are indicated by the outline 33 including a disc-like flange 35, the flange of which is of the proper diameter to be received in the cheeks 30 and 32 and in snug engagement with the shoulders 34 and 36 thereon. Through a pin 38 carried by the cheek 32 insertable into a corresponding hole in the hub flange, rotation between the table and the hub is prevented.

The barrel or axle receiving portion 37 of the hub when the hub is properly inserted in the cheeks 32 and 34 is adapted to reach below the table and engage levers 40 and 42 pivotally supported upon brackets 44 and 48 rigidly secured to the frame 18. The levers 40 and 42 actuate limit switches 50 and 52 by engaging plungers 54 and 56 depending therefrom into engagement with faces 58 and 60 of the levers 40 and 42. The adjustment of the plungers 54 and 56 is such that when the upper ends of the levers 40 and 42 are correctly positioned as would result from the proper loading of a hub therein the switches 50 and 52 are caused to open or close a circuit whichever may be desirable so that an indication as to the proper loading will be rendered and if desired, control over the operation of the machine made dependent thereon.

The novel adapter of the present invention to hold the cylinder structure 14 is constituted by a plate 62 having a peripheral shape adapted to be received by the same shoulder cheeks 30 and 32 as received the hub flange 35, the plate being provided with an aperture 64 receivable by the pin 38. The plate is provided with a collar 66 concentrically arranged upon the plate and held in position by a plurality of bolts 68. The upper portion of the collar is provided with an internal shoulder 70 and seat 72 adapted to receive a cylinder sleeve 14 and support jacket 74 therefor, the sleeve being secured in proper position within the support jacket through the interengaging shoulders 76 and 78 upon the cylinder sleeve and jacket 74 as well as by the spring pressed plunger 80 radially arranged in the end flange 82 of the jacket 74.

In order to operate the levers 40 and 42 of the switches 50 and 52 formerly operated by the barrel of the hub 37, the plate and collar are provided with a pair of slidable pins 84 and 86 arranged in bores extending paraxially from the seat 72 of the collar to a point underneath the plate 62 where they contact with levers 88 and 90. The levers 88 and 80 are in turn provided with adjustable set screws 92 and 94 which may in turn engage the levers 40 and 42. When the adapter collar 66 is properly loaded with a cylinder sleeve 14 and jacket 74, the pins 84 and 86 are pushed downwardly against the levers 88 and 90 and the set screws 92 and 94 in turn engage the spring raised end of the lever 40 and the gravity raised end of the lever 42, and by reason of the proper pre-setting of the set screws 92 and 94 and the adjustable plungers 54 and 56, the switches 50 and 52 are caused to give an indication to show that the adapter is in place and properly loaded and to operate suitable switches or other mechanism to permit the functioning of the apparatus from then on in the normal manner.

The adapter is provided with an annular body of laminated material 96 having an inner surface substantially of the same diameter as that of the internal wall of the cylinder sleeve 14 and which laminations are clamped in place between the collar 66 and the plate 62 so as to form an end extension to the cylinder sleeve 14 so as to induce uniformity of heat treatment from end to end in the sleeve. In a similar manner the heat treat head carries laminations 98 at its upper end, the details thereof being sufficiently illustrated in the drawing.

It will thus be seen that the adapter shown is readily inserted into the table in the same position such as the hub would take were it loaded upon the table. The adapter may be quickly placed upon the table and correctly aligned with the pin 38 and the table rotated so as to bring the pins 82 and 84 into proper position for registry with the levers 40 and 42. Once the adapter is properly located upon the table, subsequent cylinder sleeves for which the adapter is constructed may thereafter be quickly loaded into the collar and upon such proper loading heat treatment thereof effected. It will be appreciated that in apparatus of the type described particularly accurate loading is essential for eccentricity between the heat treat coil and the work sleeve would produce non-uniform heating as well as endanger the heat treat coil. Further, the close limits employed between the coil and sleeve additionally require the accurate loading, the indication of which is carried through the adapter. To the end that accurate loading may be assured, it will appear that the adapter through the plate 62 has a relatively broad base capable of assuring accurate alignment and its general rigidity is such that once placed in proper position, workpieces may thereafter be quickly loaded and unloaded with great facility and precision. It will, of course, be appreciated that the collar located upon the plate of the adapter may be so shaped as to receive any particular type of workpiece desired, it merely being necessary that the collar be so arranged such that the workpiece when loaded operates the indicating pins so as to produce an indication capable of preventing improperly loaded workpieces from going through the subsequent cycle of heat treatment and the operation of the apparatus effecting heat treatment.

Though a single embodiment of the invention has been illustrated and described, it is to be understood that the invention is not limited precisely thereto but may be embodied in various forms without departing from the spirit of the invention, as will be apparent to those skilled in the art. Accordingly, reference will be had to the appended claims for a definition of the limits of the invention.

What is claimed is:

1. An adapter comprising a plate having central aperture and upstanding sleeve therearound, said sleeve having an annular shouldered recess for receiving a cylindrical workpiece, a bore extending from the face of said shoulder through said sleeve and plate, a lever pivoted on the underside of said plate and having a portion thereof in alignment with said bore, said lever being adapted to engage an indicating switch, a pin in said bore, and adjustable means associated with said lever and pin whereby a gaging indication may be transmitted from the face of said shoulder to the indicating switch mechanism.

2. In an apparatus of the class described, a work receiving table, indicating mechanism for controlling the apparatus in accordance with the proper loading of the work receiving table, an adapter for said table for receiving work of a different dimension from that for which the table is adapted, and means associated with said adapter for actuating said indicating mechanism in accordance with the proper loading of said adapter.

3. In apparatus of the class described, a work receiving table having means thereon for centering and holding a workpiece of specific configuration, indicating means for controlling the apparatus in accordance with the proper loading of the work receiving table associated with said table and operable by the configuration of said workpiece when properly centered and held in said table, an adapter for said table and centering and holding means to effect centering and holding of workpieces of a different configuration and means associated with said adapter and operable by the proper centering and supporting of the workpiece of differing configuration thereon, and adapted to actuate said indicating means in the same manner as said workpiece of specific configuration when said workpiece of different configuration and said adapter are properly positioned with respect to one another and said table.

4. In induction heat treating apparatus, a table, work centering means thereon, an adapter for holding work not adapted for centering by said table centering means, said adapter comprising a plate adapted to be correctly positioned by said centering means, a work receiving recess on said adapter, and means associated with the table and carried by the adapter for indicating a proper loading of work in the adapter and proper positioning of the adapter on the table.

5. In induction heat treating apparatus, a table, work centering means thereon, an adapter for holding work not adapted for centering by said table centering means, said adapter comprising a plate adapted to be correctly positioned by said centering means, a work receiving recess on said adapter, and means including a pin movable with respect to the adapter and engageable with the work received by the adapter and operable upon means associated with the table for indicating a proper loading of work in the adapter and proper positioning of the adapter on the table.

6. An adapter for receiving cylinders for induction heat treatment comprising a plate adapted for centering upon a heat treatment machine, and a sleeve secured to said plate having an end recess adapted to receive a cylinder, an annular ring of magnetic material secured upon said adapter and clamped between said sleeve and plate and adapted to form a magnetic extension of a cylinder held by said adapter, and means carried on said adapter, sensitive to proper loading of a cylinder thereon for transmitting an indication to the heat treatment machine.

HOWARD E. SOMES.